Patented Nov. 24, 1942

2,302,994

UNITED STATES PATENT OFFICE 2,302,994

METHOD OF CONTINUOUSLY HYDROFINING FATTY ACID ESTERS

Marion H. Gwynn, Leonia, N. J.

No Drawing. Application October 3, 1938,
Serial No. 233,032

3 Claims. (Cl. 260—409)

This invention relates to a process for stabilizing glycerides by means of catalytic hydrogenation and adsorption, ordinarily with a minimum of hardening. Commercial fats and oils are processed by hydrogenation principally for the reduction of potential rancidity. In proportion as this is accomplished without hardening, the operation is termed selective.

It is the object of this invention to describe methods of improving hydrogenation selectivity and economy, improved hydrogenated products, novel continuous apparatus, and a novel hydrofining process made possible by these improvements.

The essential portion of the invention consists of the continuous catalytic hydrogenation of glycerides comprising fatty acids containing two to four unsaturations, at substantially low and regulated temperatures and with comparatively high activity catalysts, preferably nickel and stationary, segregated in a series of reaction chambers.

In general, the principal unsaturated component is converted to a cis or liquid olefinic fatty acid, with a minimum of isomerization to trans or semisolid (iso) olefinic or further hydrogenation to paraffinic acids, by means of the regulation of temperatures to the progress of the reaction and the activity of the catalysts. The temperature regulation means is preferably a non-linear ascending gradient of temperatures below about 150° C.

Gradient and continuous hydrogenation of oils has been proposed, e. g. a linear gradient at temperatures above 150° C. for the hydrogenation of oleic acid or olein to stearic acid or stearin, which hydrogenation is non-selective, and is accompanied by much isomerization of the oleic acid during the incomplete stages of hydrogenation. The use of water gas as the hydrogen source countercurrently to the oil in this prior art example implies that the temperatures are necessarily higher than 150° C. or even 200° C. On the other hand, the invention described herein requires a relatively pure hydrogen, particularly with respect to carbon monoxide, and particularly for the reduction of the catalyst. The hydrogen is also preferably fed in excess concurrently with the oil, the excess after the contact being separated and recirculated.

Since the iso-olefinic acids are semisolid or hard compared to the normal olefinic acids, the former are maintained nearly minimum when a maximum of hydrofining is desired together with a fat soft or plastic at ordinary and cool temperatures. While linolic acid is the usual source of potential rancidity, there are generally components of greater unsaturation, corresponding to potential sources of rancidity of greater intensity, such as linolenic acid in soya bean oil, a like acid in rape oil, and an acid yielding an octobromide in lard. The selective conditions herein described convert these into stable constituents, particularly when such acids are in an alpha position in the glyceride molecule.

In addition, there is another highly unsaturated group of compounds, typified by the natural coloring materials in the glycerides, which in some instances have been found to have antioxidant or other useful properties. Hydrogenation under the conditions set forth herein, substantially bleaches these compounds, with a minimum of damage to such properties, in some cases actually enhancing them. Further, the hydrogenation methods set forth herein adsorb free fatty acids on the catalyst and may decrease the free fatty acid content, and this is instrumental in decreasing rancidity. Thus the methods set forth herein are more than hydrogenation, generally they are hydrofining, that is hydrogenation and/or adsorption purifying in the presence of hydrogen.

For optimum interrelation of catalyst activities, temperatures and pressures, the reaction intensity during the progress of the reaction apparently must be relatively constant and low. The increments of hydrogenation in successive stages are substantially identical, in order to obtain maximum selectivity. The nearest description in current terminology is a reaction order of "apparent nul molecularity." In practice it is neither necessary nor desirable to maintain rigidly this condition, especially at the final portion of the operation. As a matter of ease of operation and safety, the apparent reaction order may, for instance, be allowed to become somewhat positive.

Unless the temperature or catalyst activity be adjusted in an ascending gradient, most of the hydrogenation takes place in the early stages of the apparatus, with the result that the apparent reaction order is positive, to the detriment of the selectivity. Generally a plurality or series of reaction chambers require a series of temperatures, particularly when the catalysts of the various chambers are similar. The temperature of each of the series of similar stages is adjusted so that relatively equal amounts of hydrofining occur in each of said stages. For example, the temperature may be adjusted so that the decrease of the iodine value or refractive index in each stage may be relatively or approximately equal or equalized, particularly in the earlier stages of hydrogenation. The multiplicity of temperatures can be expressed in an ascending gradient, whose acceleration is preferably negative; that is, a rapid thermal ascent in the first stages of contact and a slow ascent in the final stages of contact, or in other words, the mid stage temperature is preferably higher than the average of the first and last contacting temperatures. The range of said gradient is less than 100° C., e. g. between 20° C. or 30° C. and 60° C. or 80° C. The hydrogenation temperatures are generally elevated but less than about 150° C. For example, temperatures between 50° C. and 130° C., preferably averaging between about 100° C. and 150° C., may be used with black nickel catalyst on high grade oils. Substantially lower temperatures may be used with palladium catalyst.

The lower temperatures and pressures, especially temperatures, generally promote true selectivity. Lower temperatures particularly inhibit isomerization. However, when the temperatures and pressures are too low, the production of a given unit suffers. In addition, the hydrogenation becomes sporadic and non-uniform, which is detrimental to selectivity. The preferred temperatures and pressures are the maximum compatible with a high degree of selectivity.

The pressure and the flow are controlled so that the concentration of hydrogen at the catalyst surface, particularly activated hydrogen, is either relatively deficient or not greatly excessive with respect to the concentration of activated unsaturates. Thus the pressure is preferably low; and the flow is preferably such that the catalyst is flooded or immersed in oil or liquid esters rather than hydrogen. The latter condition is obtained when the reactants are fed from the bottom of each reaction chamber, that is upflow.

The maximum pressure compatible with a high degree of selectivity may be experimentally determined as near the point where the increases of the reaction rate is proportional to powers of the pressure greater than unity. The range of selective pressures may be defined as those pressures at which the differential of the reaction rate with respect to pressure is greater than one-half. The selective pressures are preferably below 10 or 20 atmospheres, but these may be extended much higher, particularly when the temperatures and/or catalyst activities are unusually low. Preferably the pressure is constant and superatmospheric, e. g. 3 atmospheres. However, when unable to supply reserve catalyst to replace that spent, the pressure may be increased continuously or discontinuously.

Contact times may greatly vary, depending principally upon the oil and extent of hydrofining. An example of contact times or space velocities is derivable from the following relation: For example, where the iodine value reduction is 38, one liter of oil may be hydrogenated hourly on the average in each liter of free space.

The concentration of stationary catalyst, excluding inert components, is preferably between 0.1 or 0.2 gram mole, and 10 gram moles per liter of free space, e. g. 0.5 or 1 gram mole per liter of free space.

The catalyst metal generally used is activated nickel, which may be prepared in the many ways known to the art, preferably those ways which yield the more active catalyst, e. g. those effective at lower temperatures under otherwise similar conditions. The catalyst activity of readily reducible oxidic nickel compounds and whose crystal lattice is distorted or enlarged, e. g. nickel peroxide, appear to possess a higher activity than those with a normal crystal lattice. These may be reduced in hydrogen at lower temperatures or more completely under otherwise similar conditions to yield a more active reduced catalyst. Active sulphur sensitive hydrogenating catalysts of metals other than nickel may be used, e. g. palladium, platinum, cobalt. These and other metals, e. g. copper, may be used in conjunction with nickel.

The activated catalyst is preferably pure and black, which appears to be the more active form either in the unreduced or reduced state. A pure and black nickel catalyst may be prepared by the reduction in hydrogen of a readily reducible and pure nickel compound, e. g. the formate or carbonate or hydroxide. A pure and black nickel or palladium hydroxide or oxide or peroxide or hydrated peroxide may be used without prior reduction in hydrogen, but it also preferably reduced in hydrogen at a minimum temperature compatible with rapid and substantially complete reduction. A gradient of temperatures is useful in reduction. For example, bulk nickel whose surface comprises clean nickel peroxide may be partially reduced in hydrogen at 180° C. to 200° C., then further reduction may be carried out at higher temperatures, e. g. 230° C.–260° C.

Pure and black nickel catalyst, particularly useful to this invention, may be prepared by a process comprising the anodic oxidation of pure nickel in an alkaline solution. Also useful is a black nickel catalyst prepared by dissolving non-nickel components with alkali from a nickel comprising mass.

The base for the catalytic components may be selected from those described in the prior art, e. g. kieselguhr, or for the stationary form, alundum, fused or sintered aluminum oxide, unglazed porcelain, or other foraminous inert material, but preferably rough or foraminous non-catalytic nickel itself, e. g. nickel machinings. A stationary and superficially activated elongate form of nickel is preferred to an impregnated catalyst.

The invention may be carried out in various types of apparatus, depending on the form of the catalyst, powder or stationary or stationary countercurrent. The temperature controlling means may comprise passing the heating fluid countercurrent to the oil flow. In the powder and stationary apparatus, the reaction zone is preferably divided into a series of several chambers. With powder catalyst, each of these chambers should be supplied with agitation. Not only is agitation unnecessary when the oil and gas is flowed over stationary catalysts, but subsequent separation of the catalyst and remixing with unhydrogenated portions of oil is not required. The series of chambers with stationary catalyst may comprise a series of jacketed pipes filled with a cylindrical catalyst assembly, with oil and hydrogen upflowing therethrough. To such an apparatus may be added one or more extra chambers, e. g. several extra chambers containing reserve catalyst. Or such an apparatus may comprise means for cyclically bypassing each chamber in turn, then reactivating the catalyst thereof. Or a series of chambers with stationary catalyst may well comprise a horizontal filter press type of vessel, each section comprising a catalyst assembly, means for upflowing the oil and hydrogen through the assembly, means for catching the overflowing oil and gas therefrom in order to upflow feed it to the next section. Each section may also comprise a chamber adjacent to the catalyst assembly, through which a fluid heating medium flows. Such contiguous sections are assembled serially, whereas the usual filter press sections are assembled for parallel flow.

The several stages may be accomplished in a single reaction chamber where the catalyst is contiguous and slowly moving. For example, the catalyst may slowly move downward by gravity with periodic additions of fresh catalyst at the top of the chamber and removals of spent catalyst at the bottom of the chamber. Any heating fluid may flow downward through pipes immersed in the catalyst. The oil and gas pass upflow, i. e. countercurrent to the direction of the catalyst.

The portions of the continuous hydrogenation equipment subjected to the higher temperatures are preferably of a fatty acid resisting metal, such as an aluminum alloy comprising minor quantities of other metals, or an iron alloy comprising minor quantities of chromium.

The invention is not confined to the theory or the reactant liquids or apparatus set forth herein, nor to Examples 1 and 2 below. For instance, the invention is not limited to natural glycerides, but may be otherwise applied, particularly to other esters, natural and synthetic, e. g. the esters of fatty or rosin or similar acids.

Example 1

Alkali refined soya bean oil is continuously hydrofined preparatory to deodorization by the following precedure:

A proportionating pump delivers a constant supply of oil, upflowing over the nickel catalyst, with a hydrogen feed between the pump and the first catalyst chamber. The catalyst is stationary and is segregated in a series of four connected chambers, both individually and countercurrently heated with steam.

The catalyst surface is a clean black nickel oxide or peroxide reduced in hydrogen and in a concentration of near about unit gram moles of nickel per liter of free space. The hydrogenating pressure is two atmospheres. Several fold greater volumes of hydrogen are recirculated than those absorbed. The initial hydrogenation temperatures consist of the gradient 65° C., 90° C., 105° C., 115° C., raised to 80° C., 100° C., 115° C., 125° C. by the next day, and 10° C. or even higher several days later.

The feed is regulated so that the outcoming oil, ready for deodorization, is substantially free of linolenic acid. For instance, the hexabromide test should be negative, and the iodine value should be substantially reduced, for example from an iodine value of 135 down to 125 or lower. The free fatty acid content may be decreased to 0.03% or less with a noticeably lighter color. Thus the oil is purified in several respects. Alkali refined oils of the family of cruciferae, like rape oil, are economically treated in this manner. The catalyst may be reactivated after becoming spent.

Where the amount of highly unsaturated glyceride is very small, but where it is desirable to reduce color and free fatty acids, the esters are submitted to a similar treatment, but at somewhat lower temperatures and/or pressures. For example at 10° C. or 20° C. lower temperatures, adsorption but little or even no hydrogenation may occur, particularly at reduced pressures of hydrogen. While no gas at all is necessary for the adsorption purifying, an inert gas, or one relatively poor in hydrogen, may be used.

Example 2

Example 2 is given also by way of illustration of the equalizing of hydrogenation in the different stages of the apparatus. However, the equalizing may be partial or relative and need not be approximate or carried to the full extent shown.

In Example 2, the purifying action is secondary to the reduction of potential rancidity. The finished product is hardened, although to a relative minimum, and the fat tends to fine and even crystallization. The feed oil is alkali refined cottonseed oil, iodine value 107. The equipment may be similar to that in Example 1, but with the catalyst separated and segregated in nine chambers, of which three are held in reserve. The catalyst may also be similar to that in Example 1, or may be a reduced nickel hydroxide on a stationary base. The pressure is three atmospheres, the gas being fed in a substantial excess over that required for the hydrogenation.

The temperature and refractive index at the top of each chamber are as follows:

| Catalyst chamber | Temperature, centigrade | Refractive index, 40° C. |
| --- | --- | --- |
| Preheater | 70 | 1.465 |
| 1 | 90 | 1.4640 |
| 2 | 105 | 1.4629 |
| 3 | 115 | 1.4620 |
| 4 | 120 | 1.4612 |
| 5 | 125 | 1.4606 |
| 6 | 130 | 1.4604 |

With care and more heat, the hydrogenation can be completed in 5 of the above chambers, making the reaction intensity completely uniform.

The outcoming product congeals at relatively cool temperatures, has an iodine value of 67 and thiocyanogen iodine value near 64, a marked reduction in color, and a free fatty acid content of 0.03% or less. Predeodorizing alkali treatment is unnecessary. The isooleic acid content of the outcoming product is substantially low.

During the next two days of hydrogenation, the linolic acid content rises, which may be substantially compensated by minor increases of all temperatures. A new and cold catalyst unit may then be cut in next to the first, allowing jacket steam to raise its temperature gradually to a few degrees above the first.

Subsequently, for example on the fourth day, a new catalyst unit may be cut in next to the first, allowing the steam gradually to raise its temperature to a few degrees above the first. However, it is just as desirable to drop the average temperature a few degrees with each new chamber and hold the last chamber constant. With eight chambers now, the first five are maintained at constant reaction intensity, modifying the refractive index readings at 40° C. as follows:

Chamber: Index
1 _____ 1.4644
2 (new) _____ 1.4632
3 _____ 1.4624
4 _____ 1.4617
5 _____ 1.4611

In a like manner the other chamber is cut in later. Or the three reserve chambers may be cut in after tube 6, 7, 8 respectively. An apparatus with shorter and more chambers and without reserve chambers may also be used, e. g. in the horizontal filter press form.

Other glycerides, particularly those of high palmitic acid content, e. g. palm oil, may be substituted for part of the cottonseed oil or cottonseed oil stearine. The iodine value of the hydrogenated product is preferably between 60 and 70 when hydrogenating a product substantially all cottonseed oil.

Lard, with or without alkali refining, also yields a soft linolic acid free product when hydrogenated to an iodine value near about 55, preferably under conditions between those of the cottonseed and soya bean oils. As in the previous example, part of the lard may be substituted for by glycerides such as peanut oil, cotton oil, palm oil, beef fat, especially oleo oil. For example, lard may be mixed with a minor quantity of palm oil and the mixture may then be continuously alkali refined and hydrogenated, as described herein, until the red color of the palm oil disappears.

Low grade oils, particularly soap fats or inedible marine oils, are preferably hydrogenated at higher temperatures and pressures than for the previously described high grade glycerides. For example, an alkali refined marine oil, such as whale oil, may be selectively hydrogenated with respect to the most unsaturated fatty acids at an ascending gradient of temperatures below 150° C., and then be further hydrogenated between 150 and about 200° C., preferably at a higher and relatively more autocatalytic reaction rate, the pressure both below and above 150° C. being between 5 and 15 atmospheres.

Oils and glycerides are generally pretreated to clean prior to hydrogenation. Edible glyceride processing may comprise alkali refining, hydrogenating as described herein, and then deodorizing, all preferably in a continuous manner. Inedible oils may be cleaned prior to hydrogenation by alkali refining, or by other means, particularly when the free fatty acid content is low, e. g. below 1% or 5%. Such other cleaning means may comprise agitating with hydrated sulphuric acid or fullers earth or activated earth.

Fats for soap purposes are economically rid of linolic acid and reduced in color by such pretreatments, followed by hydrogenation using conditions, for example, between those described for cottonseed and for the marine oils. Low fatty acid palm oil, Chinese vegetable tallow, animal tallows and greases are purified with a minimum of hardening with these methods.

What is claimed is:

1. A method of continuously hydrogenating fatty acid esters comprising esters of fatty acids containing two to four unsaturations with relatively little formation of paraffinic or isomerized esters, which comprises contacting the liquid esters in the presence of hydrogen with an active black nickel catalyst and regulating the temperatures so that the hydrogenation is relatively equalized in the different portions of the catalysis, particularly throughout those forward portions in which most of the hydrogenation occurs, by an ascending series of temperatures above about 50° C., but below about 150° C., while maintaining a relative deficiency of hydrogen at the catalyst surface by flooding the catalyst with an oil rather than hydrogen and also with a pressure of hydrogen between about 1 and 20 atmospheres.

2. A method as described in claim 1, in which the fatty acid esters are alkali refined natural glycerides and in which the temperatures are regulated so that the last contacting temperature is between about 20° C. and 80° C. greater than the first contacting temperature.

3. A method of continuously hydrogenating fatty acid esters comprising esters of fatty acids containing two to four unsaturations with relatively little formation of paraffinic or isomerized esters, which comprises upflowing the liquid esters together with an excess of hydrogen through the free space of an active black stationary nickel catalyst whose concentration is between 0.2 and 10 moles per liter, and regulating the temperatures so that the hydrogenation is relatively equalized in the different portions of the catalysis, particularly throughout those forward portions in which most of the hydrogenation occurs, by an ascending series of temperatures above about 50° C., but below about 150° C. and at a pressure between about 1 and 20 atmospheres.

M. H. GWYNN.